United States Patent
Jeong et al.

(10) Patent No.: US 8,182,037 B2
(45) Date of Patent: May 22, 2012

(54) FOLD-AND-DIVE SEAT ASSEMBLY FOR VEHICLE

(75) Inventors: Chan Ho Jeong, Seoul (KR); Gil Ju Kim, Gyeonggi-do (KR); Mi Sun Kwon, Seoul (KR); Seon Chae Na, Gyeonggi-do (KR); Cheol-Ho Jung, Gyeonggi-do (KR); Soon-Man Jang, Seoul (KR)

(73) Assignees: Hyundai Motor Company, Seoul (KR); Kia Motors Corporation, Seoul (KR); Lear Korea Co., Ltd., Seoul (KR)

( * ) Notice: Subject to any disclaimer, the term of this patent is extended or adjusted under 35 U.S.C. 154(b) by 152 days.

(21) Appl. No.: 12/761,951

(22) Filed: Apr. 16, 2010

(65) Prior Publication Data

US 2011/0133535 A1 Jun. 9, 2011

(30) Foreign Application Priority Data

Dec. 3, 2009 (KR) .................. 10-2009-0119168

(51) Int. Cl.
*B60N 2/04* (2006.01)
*B60N 2/20* (2006.01)
*B60N 2/30* (2006.01)
*B60N 2/36* (2006.01)

(52) U.S. Cl. .............. 297/331; 297/61; 297/378.12; 297/378.14

(58) Field of Classification Search .............. 297/61, 297/331, 378.12, 378.14
See application file for complete search history.

(56) References Cited

U.S. PATENT DOCUMENTS

| | | | | |
|---|---|---|---|---|
| 4,082,354 A | * | 4/1978 | Renner et al. | 297/410 |
| 5,011,225 A | * | 4/1991 | Nemoto | 297/410 X |
| 5,071,190 A | * | 12/1991 | Tame | 297/391 X |
| 5,145,233 A | * | 9/1992 | Nagashima | 297/408 |
| 5,282,668 A | | 2/1994 | Heussner et al. | |
| 5,681,079 A | * | 10/1997 | Robinson | 297/378.12 X |
| 5,738,411 A | * | 4/1998 | Sutton et al. | 297/378.12 |
| 5,795,023 A | * | 8/1998 | Kayumi | 297/331 |
| 5,826,942 A | * | 10/1998 | Sutton et al. | 297/378.12 |
| 5,918,940 A | * | 7/1999 | Wakamatsu et al. | 297/410 |
| 6,192,565 B1 | * | 2/2001 | Tame | 297/61 |
| 6,390,558 B2 | * | 5/2002 | Fischer et al. | 297/410 |
| 6,860,564 B2 | * | 3/2005 | Reed et al. | 297/378.12 X |
| 7,044,555 B2 | * | 5/2006 | Saberan | 297/378.12 X |
| 7,059,681 B2 | | 6/2006 | Kubo | |
| 7,118,171 B2 | * | 10/2006 | Fowler et al. | 297/61 |

(Continued)

FOREIGN PATENT DOCUMENTS

JP 2007-106292 A 4/2007

(Continued)

*Primary Examiner* — Rodney B White
(74) *Attorney, Agent, or Firm* — Morgan, Lewis & Bockius LLP

(57) ABSTRACT

A fold-and-dive seat assembly for a vehicle is disclosed. The fold-and-dive seat assembly includes a seat cushion dived downward toward a floor panel by means of a dive link, a seat back connected to the seat cushion by a connection link, and rotatably connected to the floor panel to be folded toward the seat cushion, a head rest provided on an upper end of the seat back, a sliding unit, connected to the head rest and the seat back, for moving the head rest in a back and forth direction in a sliding manner, and a slid driving member for operating the sliding unit in link with the dive link, upon folding and diving, to slide the head rest in a rearward direction.

10 Claims, 10 Drawing Sheets

U.S. PATENT DOCUMENTS

| | | | |
|---|---|---|---|
| 7,210,734 B1* | 5/2007 | Yetukuri et al. | 297/378.12 X |
| 7,258,400 B2* | 8/2007 | Yamada | 297/378.12 |
| 7,367,626 B2* | 5/2008 | Lawall et al. | 297/410 |
| 7,517,009 B2* | 4/2009 | Mauro et al. | 297/61 |
| 7,740,319 B2* | 6/2010 | Furukawa et al. | 297/408 |
| 7,758,126 B2* | 7/2010 | Haase | 297/378.12 X |
| 7,878,596 B2* | 2/2011 | Brunner et al. | 297/378.12 X |
| 7,901,007 B2* | 3/2011 | Lindsay | 297/410 |
| 7,967,375 B2* | 6/2011 | Yu et al. | 297/61 |
| 8,083,287 B2* | 12/2011 | Yu et al. | 297/61 |
| 2005/0057081 A1* | 3/2005 | Kahn et al. | 297/331 |
| 2005/0116523 A1* | 6/2005 | Terada et al. | 297/391 |
| 2006/0001305 A1* | 1/2006 | Christopher et al. | 297/331 |
| 2006/0103216 A1* | 5/2006 | Hoekstra et al. | 297/410 |
| 2007/0152487 A1* | 7/2007 | Brockman et al. | 297/378.12 X |

FOREIGN PATENT DOCUMENTS

| | | |
|---|---|---|
| KR | 20-0138202 | 12/1998 |
| KR | 1019990052797 A | 7/1999 |
| KR | 100774419 B1 | 11/2007 |
| KR | 10-2008-0094385 A | 10/2008 |

* cited by examiner

FOLD-AND-DIVE SEAT ASSEMBLY FOR VEHICLE

CROSS-REFERENCE TO RELATED APPLICATION

The present application claims priority to Korean Patent Application No. 10-2009-119168, filed on Dec. 3, 2009, the entire contents of which is incorporated herein for all purposes by this reference.

BACKGROUND OF THE INVENTION

1. Field of the Invention

The present invention relates to a fold-and-dive (or fold-down) seat for a vehicle, and more particularly, to a fold-and-dive seat assembly for a vehicle, of which a head rest is moved rearward when a rear seat is folded, thereby preventing the folded seat from interfering with a front seat.

2. Description of Related Art

In general, seats for a vehicle are trends of development of a complex structure due to various functions, such as a seating function for passengers, a storage function for cargo, a work-in function for convenience riding of passengers for a seat of $3^{rd}$ row, a full-flat function of seats of $2^{nd}$ and $3^{rd}$ rows. Recently, a fold-and-dive seat, which may be called a fold-down seat, has been developed and used, in which a seat back is folded towards a seat cushion, and simultaneously the seat cushion is moved downward, so that a rear space is usable as a storage and cargo space.

A fold-and-dive seat (i.e. rear seat) 101 of a related art includes, as shown in FIG. 1, a seat cushion 103 which can be dived or moved downward toward a floor panel, a seat back 105 which can be folded toward the seat cushion 103, and a head rest 107, provided on an upper end of the seat back 105, for supporting a passenger's head.

The head rest 107 is adapted to be folded at a right angle when the seat back 105 is folded, and is installed on the upper end of the seat back 15 in an upright state.

With the fold-and-dive seat 101 for the vehicle according to the related art, when the head rest 107 is folded in combination with the seat back 105, the folding operation of the fold-and-dive seat is interfered by the seat back 205 of a front seat. In order to prevent the interference, after the front seat has to be moved forward, the seat back 105 is folded.

In addition, since a distance between the head rest 107 and the floor panel is short after the fold-and-dive operation is completed, the head rest 107 may be contaminated by dust.

Moreover, since the head rest 107 stands upright from the upper end of the seat back 105 in the state in which a passenger seats, a driver is difficult to secure a rear sight.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a fold-and-dive seat assembly for a vehicle which can prevent interference between a head rest of a seat to be folded and a seat back of a front seat, and secure a gap between the head rest of the seat and a floor panel to prevent the head rest from be contaminated by dust or the like and to provide a fold-and-dive seat assembly for a vehicle which can prevent a head rest from hiding a rear sight when a passenger seats thereon.

In aspect of the present invention, the fold-and-dive seat assembly for a vehicle, may include a dive link pivotally connecting a cushion frame and a floor panel to be selectively dived toward the floor panel, a back frame pivotally connected to the floor panel, wherein the back frame and the cushion frame are pivotally connected each other by a connection link and the back frame is selectively folded toward the cushion frame, a head rest provided on an upper end portion of the back frame, a sliding unit connected to the head rest and the back frame and selectively moving the head rest in a forward and rearward direction in a sliding manner in accordance with a rotation of the back frame, and a slide driving member operating the sliding unit in link with the dive link, upon folding and diving the back frame to slide the head rest in a rearward direction.

The seat assembly may further include a locking member disposed between the back frame and the head rest and selectively locking the sliding unit to the back frame to displace the head rest at a front position.

The sliding unit may include a first sliding link having one end hinge-connected to the head rest and the other end hinge-connected to the back frame, and a second sliding link operated in link with the first sliding bracket, and having one end hinge-connected to the head rest and the other end hinge-connected to the back frame.

The sliding unit may further include an elastic member constantly biasing the head rest against the back frame in a forward direction.

The seat assembly may further include a first support bracket and a second support bracket which are respectively fixed to the head rest and the back frame, wherein the one end of the first sliding link is hinge-connected to the first support bracket, and the other end thereof is hinge-connected to the second support bracket by a first hinge shaft, and wherein the one end of the second sliding link is hinge-engaged to the first support bracket and the other end thereof is hinge-engaged to the second support bracket by a second hinge shaft.

The seat assembly may further include a first rotation link rotatably connected to the first hinge shaft, and a second rotation link, one end of which is pivotally coupled to a middle portion of the second sliding link and the other end of which is pivotally coupled to a first end portion of the first rotation link such that the second rotation link is rotated with respect to the first hinge shaft by the first rotation link, wherein the locking member includes a locking groove formed onto a second end portion of the first rotation link, and the second hinge shaft is selectively locked onto the locking groove by rotation of the first rotation link activated by the slide driving member.

The slide driving member may include a cable, one end of which is connected to the dive link, and the other end of which is connected to a third end portion of the first rotation link, and while the dive link is rotated in a forward direction by the back frame, the cable is pulled in a forward direction to rotate the first rotation link in a rearward direction, thereby unlocking the locking groove of the first rotation link from the second hinge shaft.

With the above description, according to various aspect of the present invention, the head rest of the seat to be folded does not interfere with a seat back of a front seat. In addition, the gap between the head rest of the seat and a floor panel is secured to prevent the head rest from be contaminated by dust or the like.

Further, since the head rest is formed in a helmet shape, a drive can effectively secure a rear sight.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
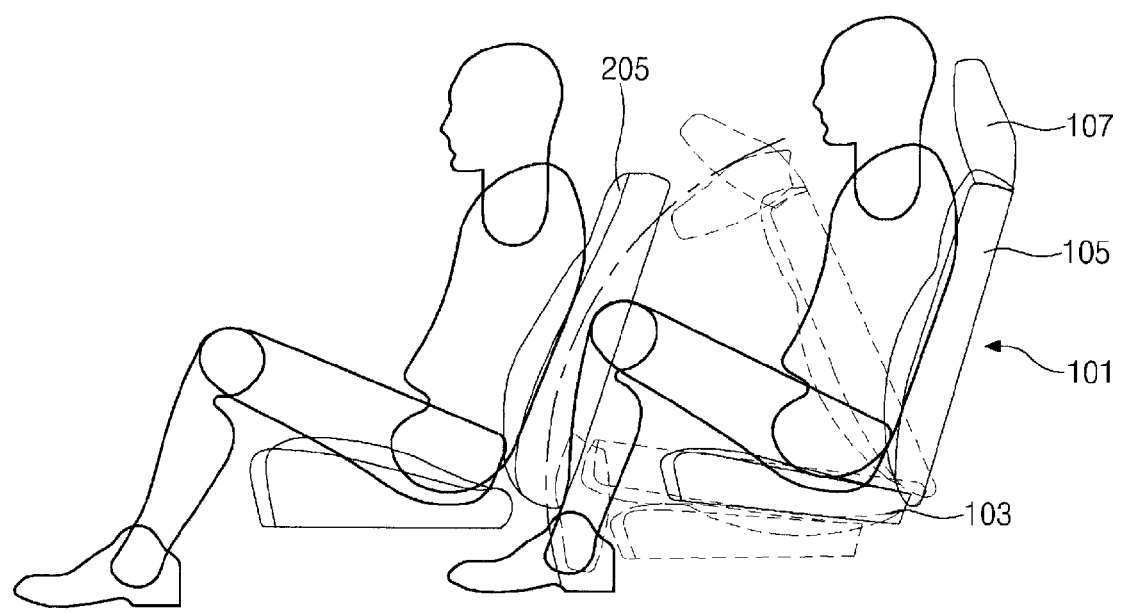
FIG. 1 is a side view illustrating a folding and diving process of a fold-and-dive seat for a vehicle according to a related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
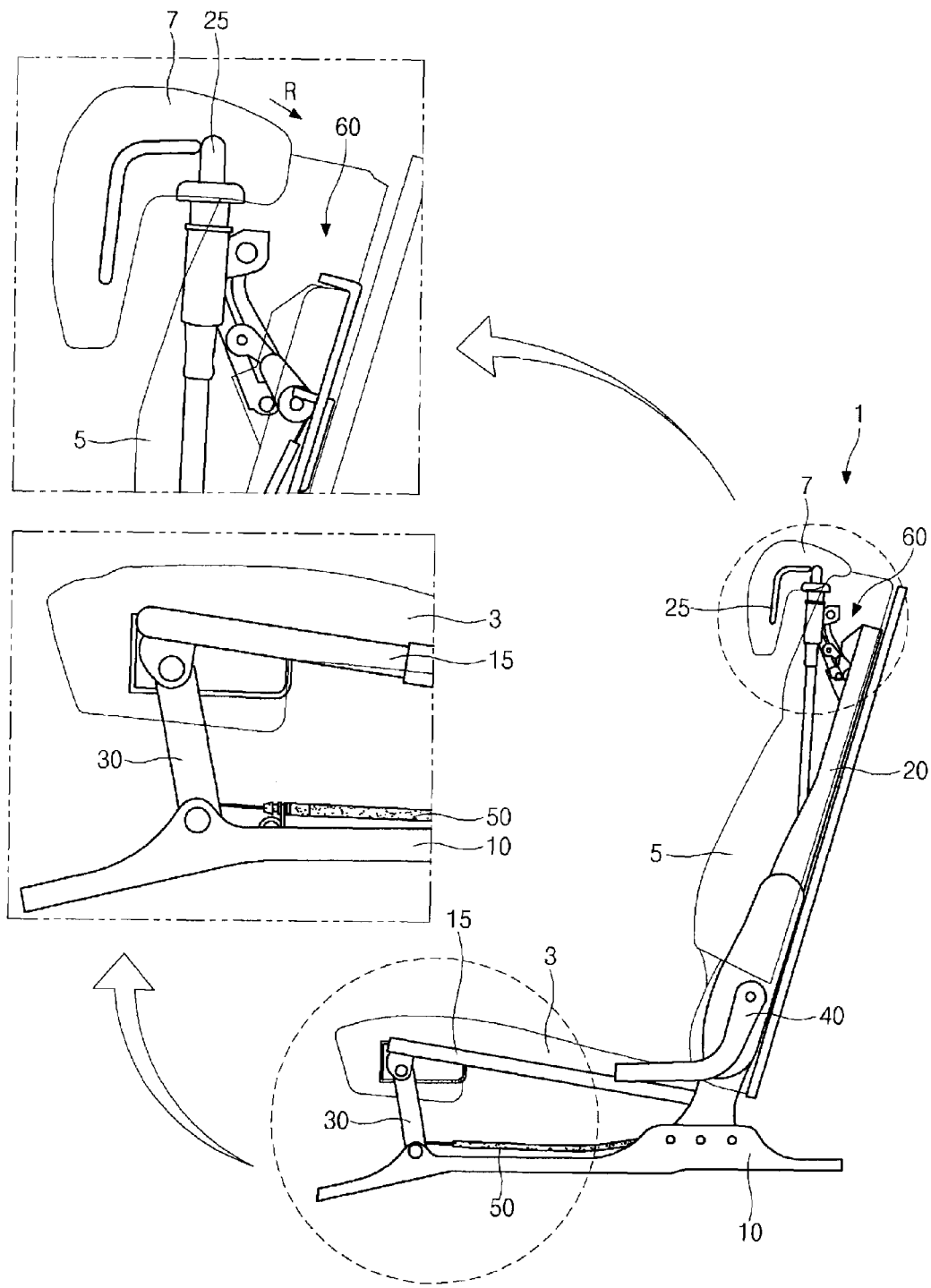
FIGS. 2 to 4 are side views illustrating a folding and diving process of an exemplary fold-and-dive seat for a vehicle according to the present invention.
Figure 3:
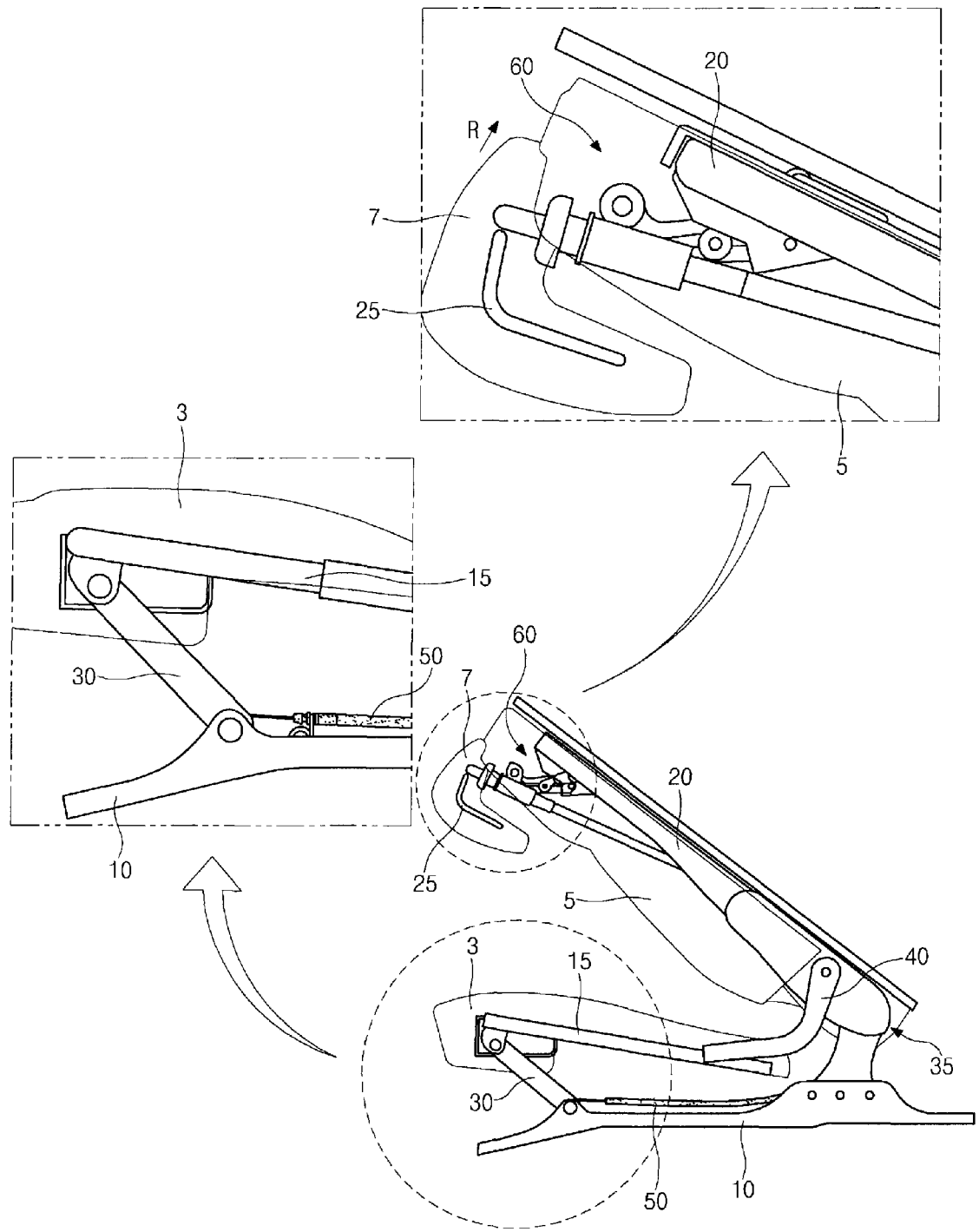
Figure 4:
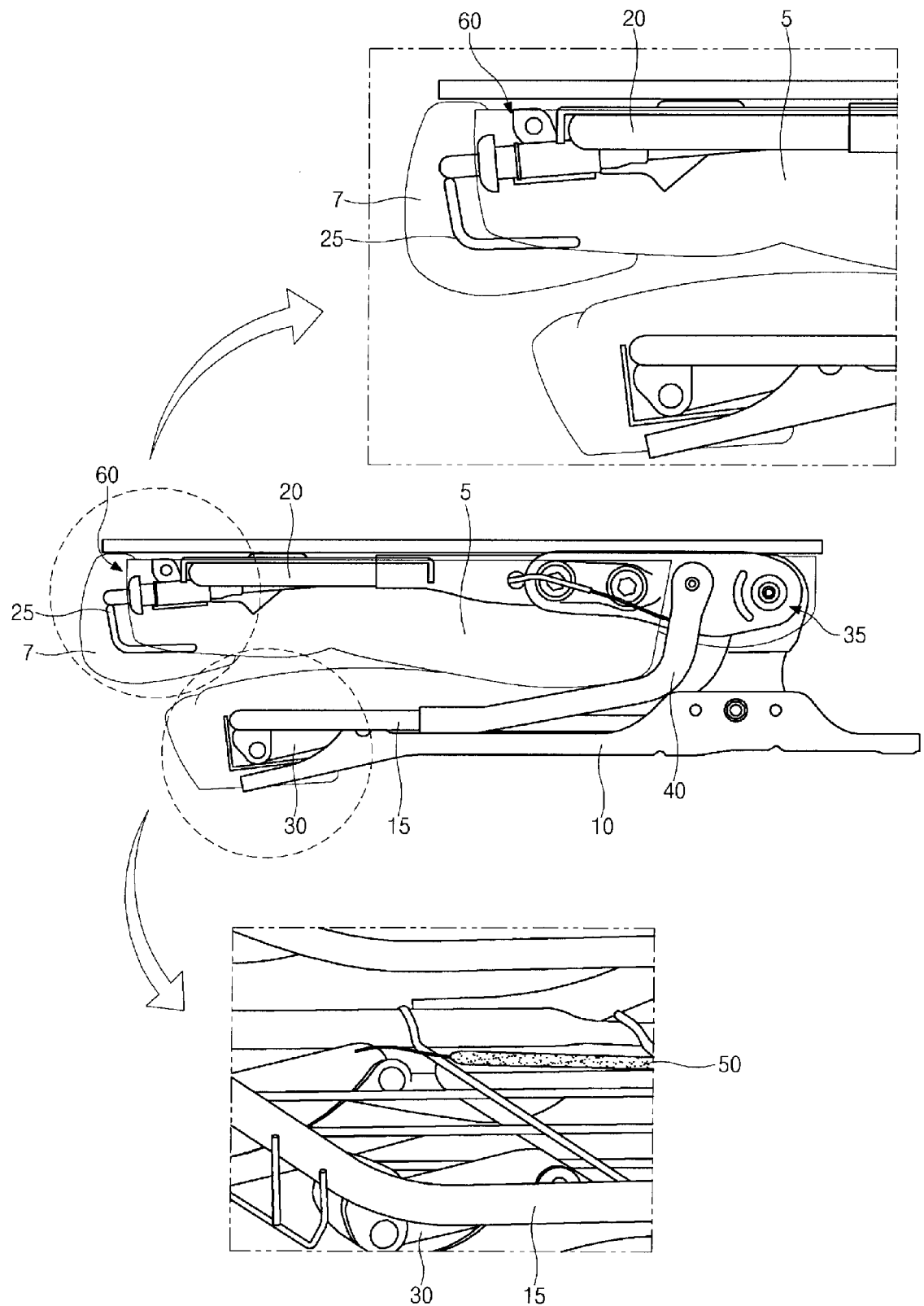
Figure 5:
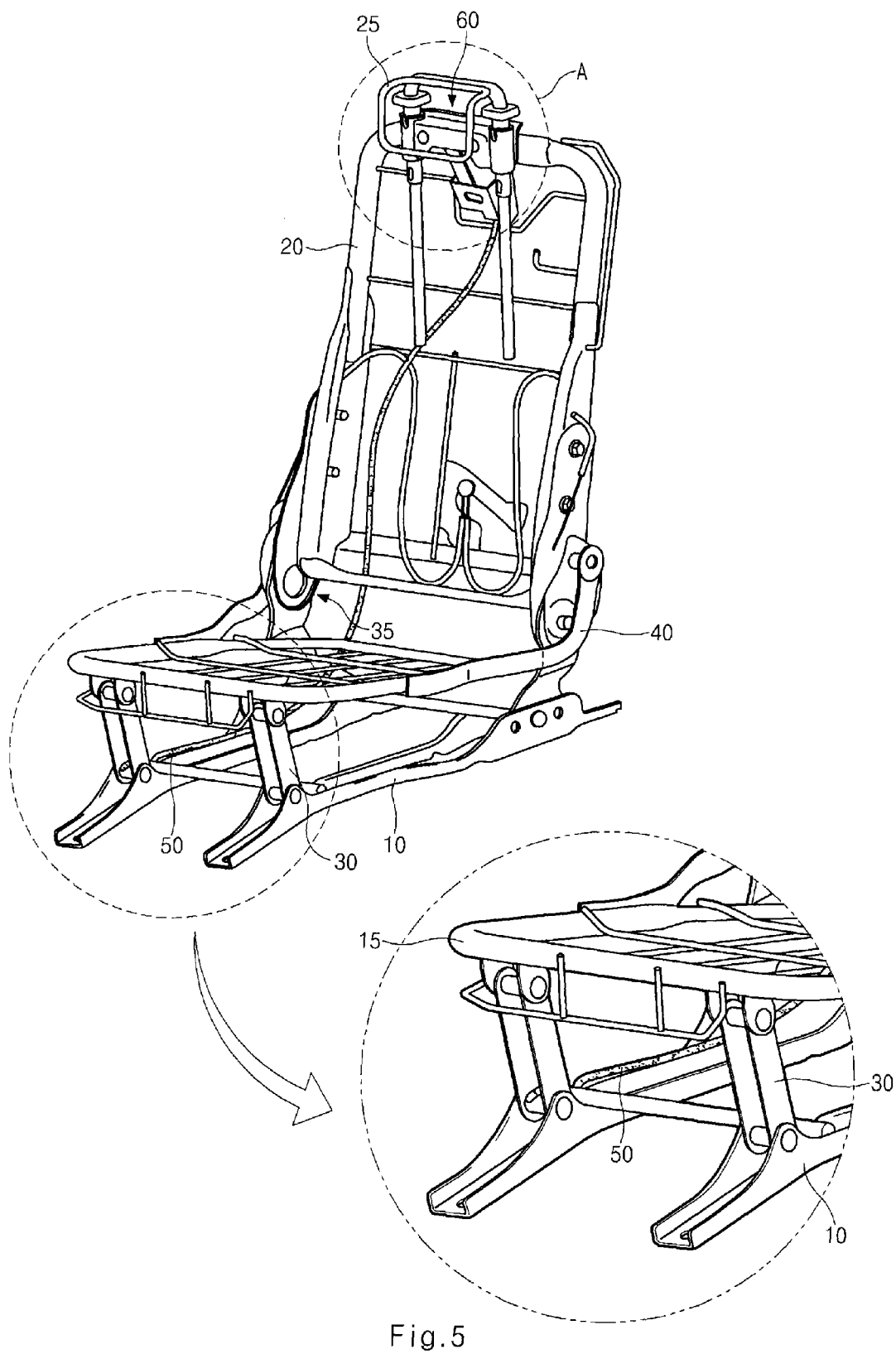
FIG. 5 is a perspective view illustrating the configuration of an exemplary fold-and-dive seat for a vehicle according to the present invention.

FIGS. 2 to 4 are side views illustrating a folding and diving process of a fold-and-dive seat for vehicle according to an embodiment of the present invention. FIG. 5 is a perspective view illustrating the configuration of the fold-and-dive seat for vehicle according to an embodiment of the present invention.

A fold-and-dive seat 1 for vehicle according to an exemplary embodiment of the present invention is characterized in that a head rest 7 is positioned at the front of a seat back 5 in the case in which the head rest 7 is used (see FIG. 2), and the head rest 7 is slid in a backward direction R in link with a dive link 30 and then the seat back 5 is fully folded toward a seat cushion 3 upon folding and diving (see FIGS. 3 and 4).

To this, the fold-and-dive seat 1 includes a seat cushion 3 dived downward toward a floor panel, a seat back 5 folded toward the seat cushion 3, a head rest 7 provided on an upper end of the seat back 5, a sliding unit 60 for moving the head rest 7 in a sliding manner, and a slide driving member 50 for operating the sliding unit 60 in link with a dive link 30 upon folding and diving to slide the head rest 7 in a rearward direction.

The floor panel is provided with a support frame 10 extending in a longitudinal direction to support the fold-and-dive seat 1.

The seat cushion 3 is adapted to provide a passenger with a seat, and is moved downward toward the floor panel by the dive link 30 provided on a lower portion. That is, the upper end of the dive link 30 is hinge-engaged to a front bottom surface of the cushion frame 15, and a lower end is hinge-engaged to a front portion of the support frame 10.

In this instance, the dive link 30 is integrally connected to one end of a cable constituting the slide driving member 50.

The seat back 5 is adapted to support a back of the passenger, and is supported by the back frame 20. In this instance, a lateral surface of the cushion frame 15 is hinge-connected to a later surface of the back frame 20 by means of a connection link 40 of a boomerang shape. In addition, the back frame 20 is connected to a rear portion of the support frame 10 by means of a recliner 35, so that the seat back 5 can be folded with respect to the seat cushion 3.

The head rest 7 is adapted to support a head of the passenger, and is supported by the head rest frame 25. In this instance, it is preferable that the head rest frame 25 is adapted to adjust a height of the head rest 7. In addition, the head rest 7 is formed in the helmet shape having an L-shaped cross section. That is, the head rest is not formed in an upright shape on the upper end of the seat back 5, but formed to enclose the upper end of the seat back 5, thereby securing a rear sight.

Figure 6:
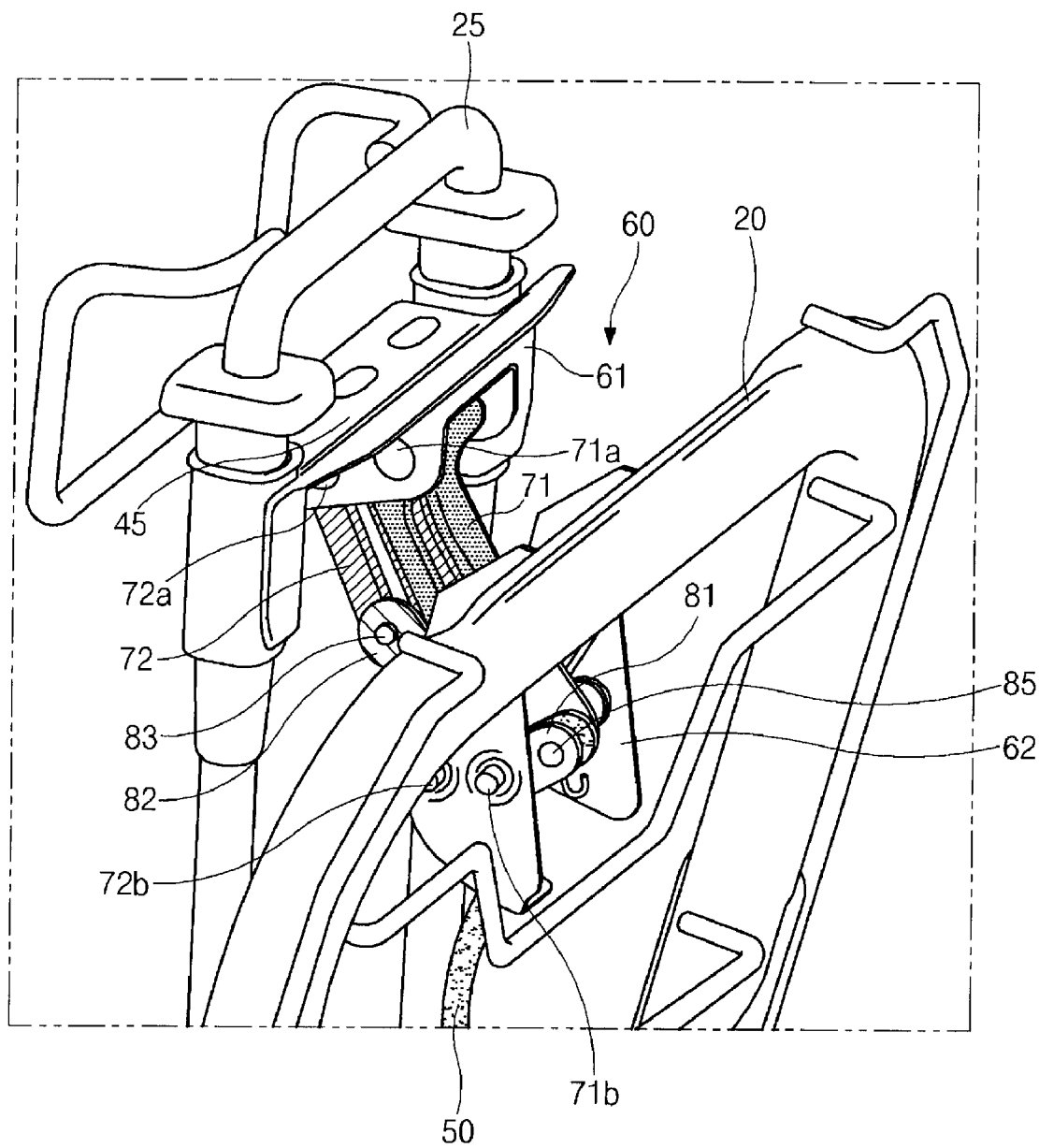
FIG. 6 is an enlarged perspective view of the portion A in FIG. 5.
Figure 7:
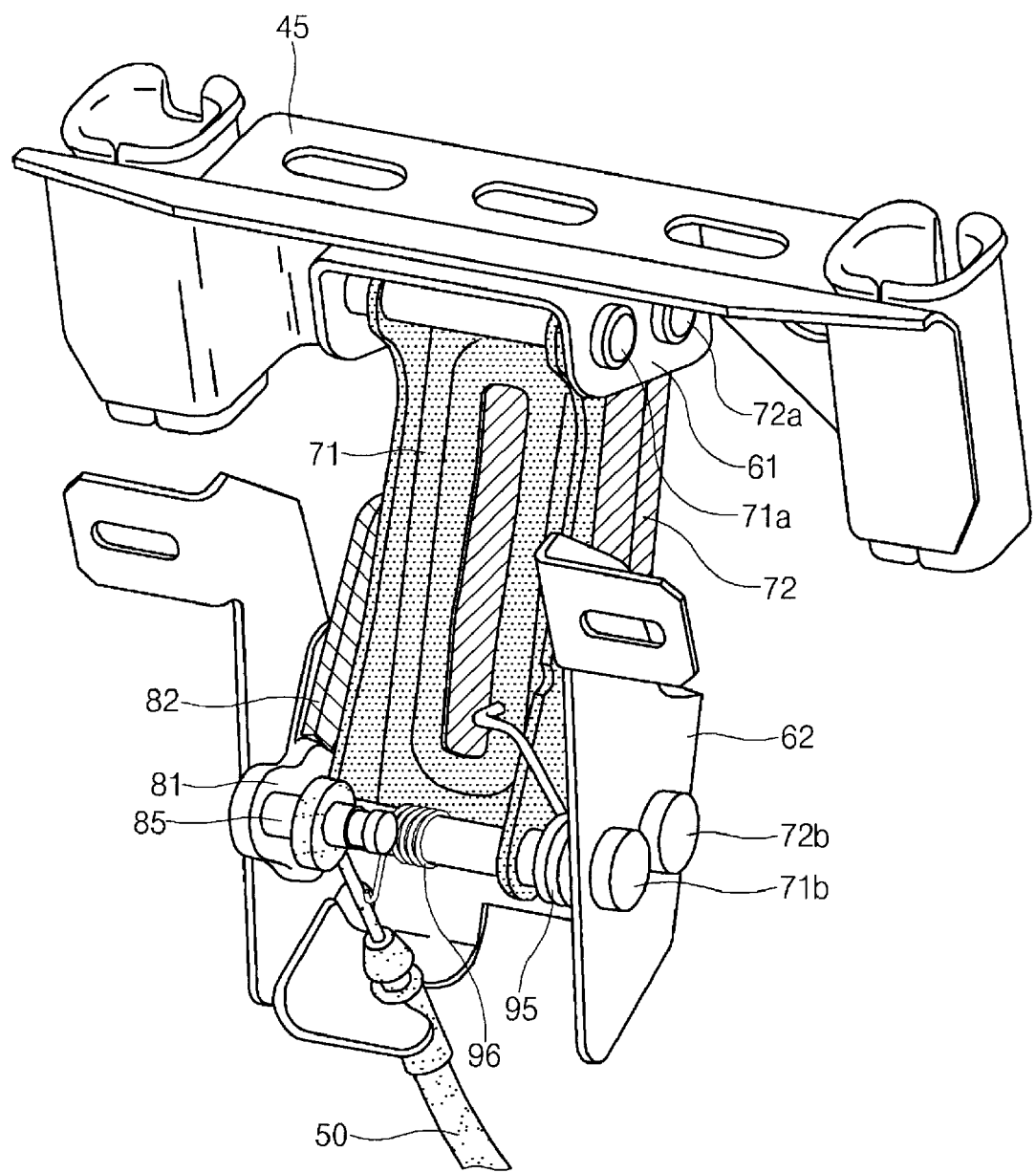
FIG. 7 is a perspective view illustrating a sliding unit when a head rest of an exemplary fold-and-dive seat for a vehicle according to the present invention is positioned at a front position (a normal state shown in FIG. 2).

The sliding unit 60 is provided between the head rest frame 25 and the back frame 20 to move the head rest 7 in a back and forth direction in a sling manner with respect to the seat back 5. The detailed configuration is shown in FIGS. 6 and 7.

More specifically, the sliding unit 60 includes a first support bracket 61 and a second support bracket 62 which are respectively fixed to the head rest frame 25 and the back frame 20, and a first sliding link 71 and a second sliding link 72 which are respectively connected to the first support bracket 61 and the second support bracket 62 at both ends thereof.

The first support bracket 61 is integrally fixed to the head rest frame 25 by means of a fixing bracket 45, and the second support bracket 62 is integrally fixed to the back frame 20.

One end of the first sliding link 71 is hinge-connected to the first support bracket 61 by means of a first hinge shaft 71a, and the other end is hinge-connected to the second support bracket 62 by means of a second hinge shaft 71b.

In this instance, the second hinge shaft 71b may be provided with two return springs 95 and 96 for constantly pushing the head rest 7 forwardly. The return spring is constituted of a first return spring 95 having one end fixed to the second support bracket 62, and a second return spring 96 having one end fixed to the first sliding link 71. Of course, one return spring may be provided, with one end being fixed to the second support bracket 62 and the other end being fixed to the first sliding link 71.

The second sliding link 72 is positioned in front of the first sliding link 71, and is operated in combination with the first sliding link 71. In this instance, one end of the second sliding link 72 is hinge-engaged to the first support bracket 61 by means of a third hinge shaft 72a, and the other end is hinge-engaged to the second support bracket 62 by means of a fourth hinge shaft 72b.

Figure 8:
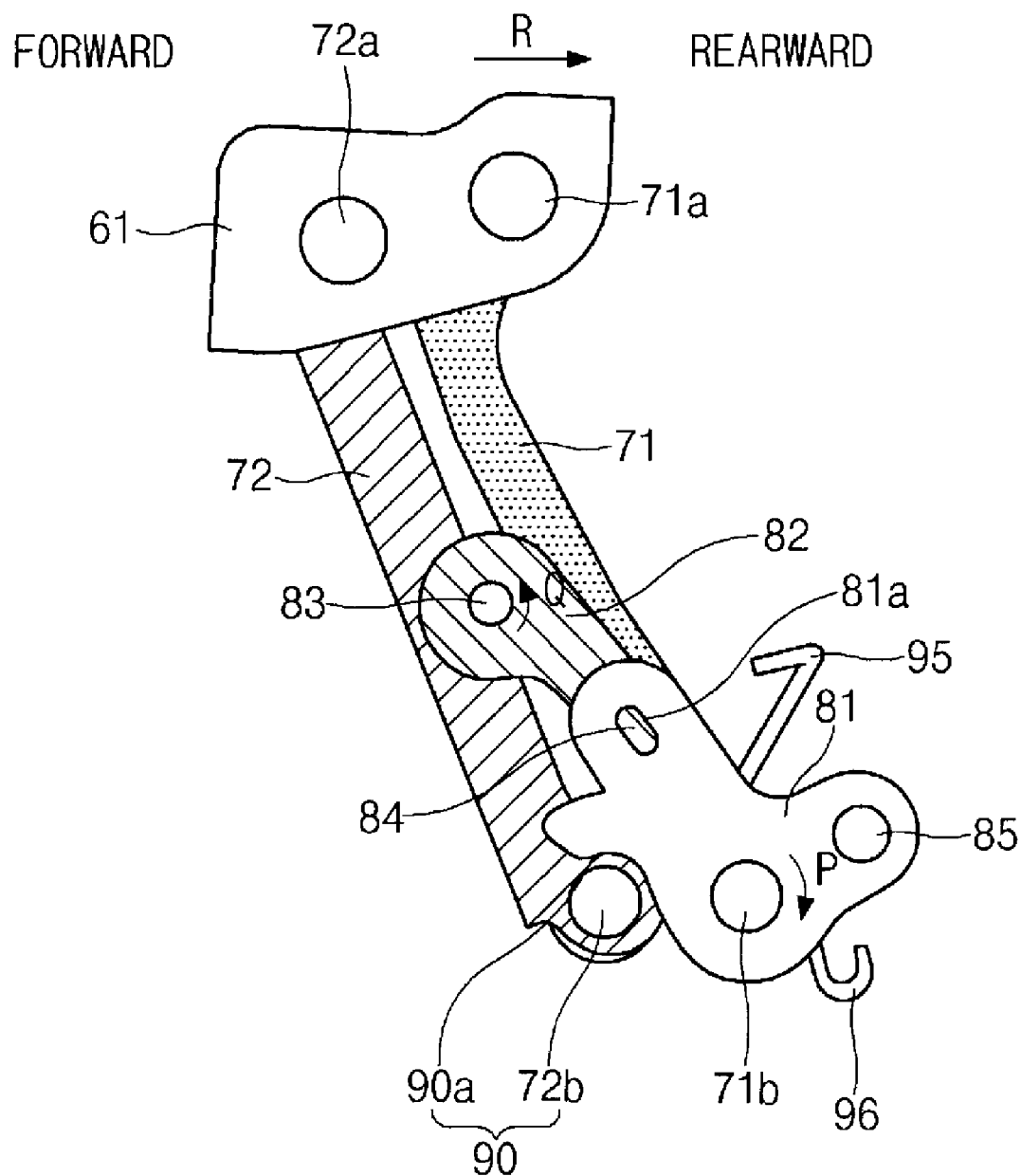
FIG. 8 is a side view of FIG. 7.

A first rotation link 81 is rotatably connected to the second hinge shaft 71b, and a second rotation link 82 is installed to the second sliding link 72 and is rotated around a rotational shaft 83 in link with the first rotation link 81, so that the first sliding link 71 and the second sliding link 72 can be operated in interworking manner (see FIG. 8). That is, if the first rotation link 81 is rotated around the second hinge shaft 71b, the second rotation link 82 integrally connected to the first rotation link 81 is rotated around the rotational shaft 83, so that the first sliding link 71 and the second sliding link 72 are respectively rotated and moved in a rearward direction, and the head rest 7 is slid in a rearward direction.

The first rotation link 81 is provided with an engaging hole 81a, and the second rotation link 82 is provided with an engaging boss 84 which is fitted into the engaging hole 81a. Also, the first rotation link 81 is provided with an operation pin 85 to which the other end of the cable 50 is connected to rotate the first rotation link 81.

The fold-and-dive seat further includes a locking member 90 for locking the head rest 7 at a front position. The locking member 90 includes a locking groove 90a formed on the first rotation link 81, and the fourth hinge shaft 72b locked on the locking groove 90a. If the fourth hinge shaft 72b is locked on the locking groove 90a, the head rest 7 is supported at the front position, as shown in FIG. 2.

The cable 50 serving as a slide driving member is used as a means for unlocking the locking member 90. One end of the cable 50 is connected to the dive link 30, and the other end is connected to the operation pin 85.

If a user operates a fold-and-dive lever (not shown) provided on a rear surface of the seat back 5, the cushion frame 15 is moved in a forward direction, and the dive link 30 is rotated forwardly, so that the dive link 30 pulls the cable 50. As a result, the first rotation link 81 connected to the cable 50 is rotated around the second hinge shaft 71b in a clockwise direction P to release the locking state. The second rotation link 82 is rotated around the rotational shaft 83 in a counter-clockwise direction Q, and the first sliding link 71 and the second sliding link 72 are rotated. Accordingly, the first support bracket 61 is slid in a rearward direction, and the head rest 7 is slid in a rearward direction R.

With the above configuration, the operation of the fold-and-dive seat 1 for vehicle according to the present invention will be described briefly.

FIG. 2 shows the state in which the seat back 5 is not folded. In this instance, the locking groove 90a of the first rotation link 81 is locked on the fourth hinge shaft 72b, and the head rest 7 is maintained at the front position by the force of the return springs 95 and 96.

Figure 9:
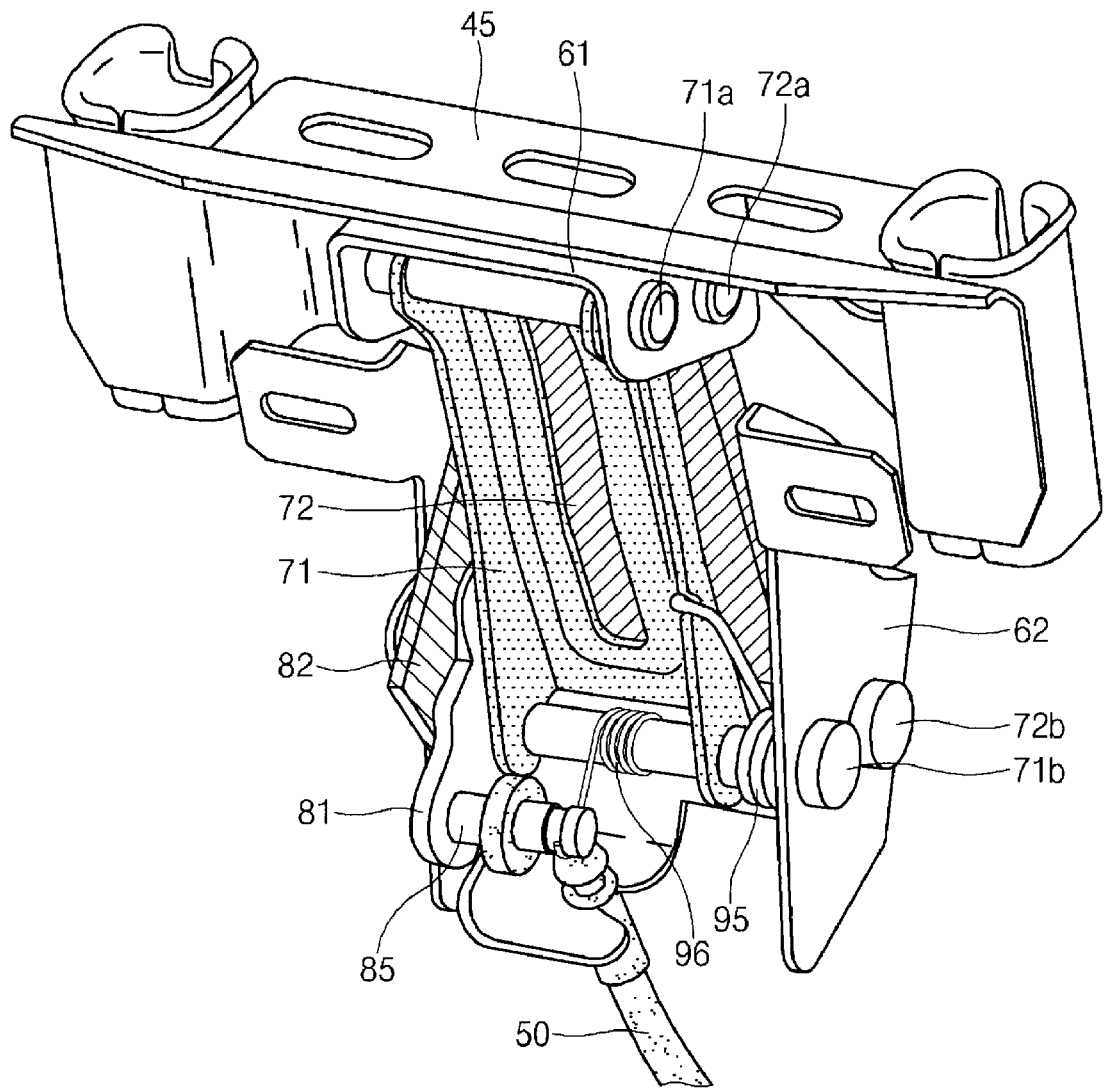
FIG. 9 is a perspective view illustrating a sliding unit when a head rest of a exemplary fold-and-dive seat for a vehicle according to the present invention is positioned at a rear position (a state shown in FIG. 4).
Figure 10:
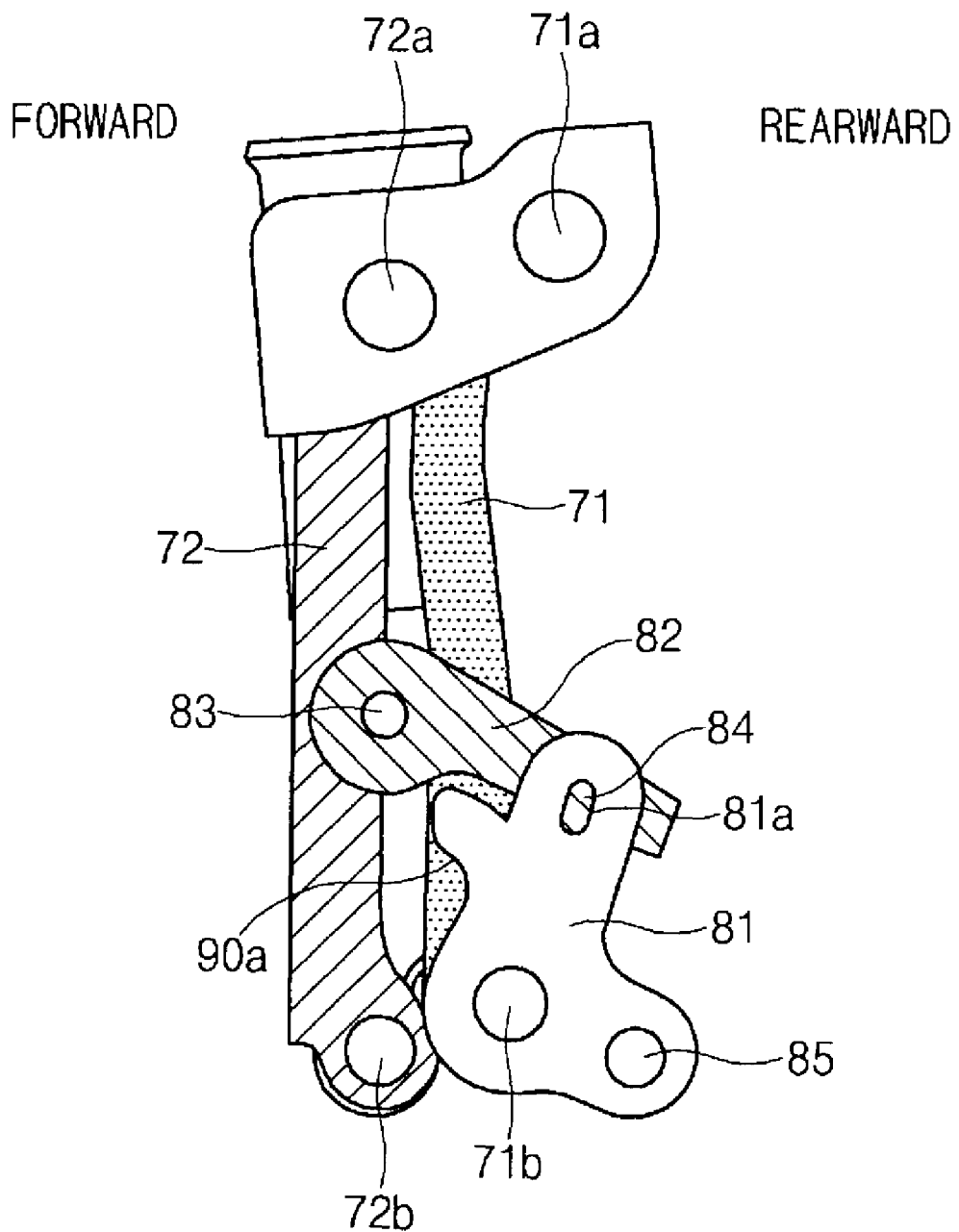
FIG. 10 is a side view of FIG. 9.

After that, if the user operates the fold-and-dive lever, as shown in FIGS. 3 and 4, the cushion frame 15 is moved in a forward direction, and the dive link 30 is rotated in a forward direction to pull the cable 50 in a forward direction. Consequently, the cable 50 rotates the first rotation link 81 around the second hinge shaft 71b in a clockwise direction P to release the locking state, and thus the second rotation link 82 is rotated in a counterclockwise direction Q (see FIG. 8). As a result, as shown in FIGS. 9 and 10, as the first sliding link 71 and the second sliding link 72 are rotates, the first support bracket 61 is slid towards the back frame 20, so that the head rest 7 is finally slid in a rearward direction, as shown in FIG. 4.

As described above, according to the invention, as the head rest 7 positioned at the front position is slid in a rearward direction R upon folding and diving, and does not interfere with the seat back of the front seat, so that it is not necessary to move the front seat in a forward direction, which is effective in use.

Since the head rest 7 is positioned over the seat cushion 3 in the state in which the folding and diving operation is completed (the state shown in FIG. 4), a gap between the floor panel and the head rest 7 is sufficient to prevent the head rest 7 from contaminated due to the dust or the like.

Further, since the head rest 7 is formed in a helmet shaft, it is advantageous to secure the rear sight.

For convenience in explanation and accurate definition in the appended claims, the terms "upper" or "lower", "forward" and "rearward" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fold-and-dive seat assembly for a vehicle, comprising:
a dive link pivotally connecting a cushion frame and a floor panel to be selectively dived toward the floor panel;
a back frame pivotally connected to the floor panel, wherein the back frame and the cushion frame are pivotally connected each other by a connection link and the back frame is selectively folded toward the cushion frame;
a head rest provided on an upper end portion of the back frame;
a sliding unit connected to the head rest and the back frame and selectively moving the head rest in a forward and rearward direction in a sliding manner in accordance with a rotation of the back frame; and
a slide driving member connected to the dive link and the sliding unit, and operating the sliding unit in link with the dive link, upon folding and diving the back frame in a forward direction to slide the head rest in a rearward direction.

2. The seat assembly according to claim 1, further comprising a locking member disposed between the back frame and the head rest and selectively locking the sliding unit to the back frame to displace the head rest at a front position.

3. The seat assembly according to claim 2, wherein the sliding unit includes:
a first sliding link having a first end hinge-connected to the head rest and a second end hinge-connected to the back frame; and
a second sliding link operated in link with the first sliding link, and having a first end hinge-connected to the head rest and a second end hinge-connected to the back frame.

4. The seat assembly according to claim 3, wherein the sliding unit further includes an elastic member constantly biasing the head rest against the back frame in a forward direction.

5. The seat assembly according to claim 3, further comprising a first support bracket and a second support bracket which are respectively fixed to the head rest and the back frame,
  wherein the first end of the first sliding link is hinge-connected to the first support bracket, and the second end thereof is hinge-connected to the second support bracket by a first hinge shaft, and
  wherein the first end of the second sliding link is hinge-engaged to the first support bracket and the second end thereof is hinge-engaged to the second support bracket by a second hinge shaft.

6. The seat assembly according to claim 5, further comprising:
  a first rotation link rotatably connected to the first hinge shaft; and
  a second rotation link, a first end of which is pivotally coupled to a middle portion of the second sliding link and a second end of which is pivotally coupled to a first end portion of the first rotation link such that the second rotation link is rotated with respect to the first hinge shaft by the first rotation link.

7. The seat assembly according to claim 6, wherein the locking member includes a locking groove formed onto a second end portion of the first rotation link, and the second hinge shaft is selectively locked onto the locking groove by rotation of the first rotation link activated by the slide driving member.

8. The seat assembly according to claim 7, wherein the slide driving member includes a cable, a first end of which is connected to the dive link, and a second end of which is connected to a third end portion of the first rotation link, and while the dive link is rotated in a forward direction by the back frame, the cable is pulled in a forward direction to rotate the first rotation link in a rearward direction, thereby unlocking the locking groove of the first rotation link from the second hinge shaft.

9. A fold-and-dive seat assembly for a vehicle, comprising:
  a cushion frame;
  a back frame foldable toward the cushion frame;
  a head rest protruding forwardly from an upper end of the back frame and formed in a helmet shape;
  a sliding unit connected to the head rest and the back frame and selectively moving the head rest in a rearward direction in a sliding manner according to rotation of the back frame; and
  a slide driving member connecting the cushion frame and sliding unit and operating the sliding unit to release the head rest from the back frame such that the head rest slides in a rearward direction while the cushion frame is dived in a forward direction by the back frame.

10. A fold-and-dive seat assembly for a vehicle, comprising:
  a dive link pivotally connecting a cushion frame and a floor panel;
  a back frame pivotally connected to the floor panel, wherein the back frame and the cushion frame are pivotally coupled each other by a connection link to selectively move the cushion frame and rotate the dive link by folding the back frame;
  a first support bracket fixed to a head rest;
  a second support bracket fixed to an upper portion of the back frame;
  a first sliding link, a first end of which is pivotally coupled to the first support bracket and a second end of which is pivotally coupled to the second support bracket by a first hinge shaft; and
  a second sliding link, a first end of which is pivotally coupled to the first sliding bracket and a second end of which is pivotally coupled to the second support bracket by a second hinge shaft;
  a first rotation link rotatably coupled to the second support bracket by the first hinge shaft;
  a second rotation link, a first end of which is pivotally coupled to a middle portion of the second sliding link and a second end of which is pivotally coupled to a first end portion of the first rotation link, such that the second rotation link pivotally coupled to the second sliding link is rotated by the first rotation link;
  a locking groove formed onto a second end portion of the first rotation link and selectively locking the second hinge shaft therein by rotation of the first rotation link; and
  a slide driving member coupling the dive link and a third end portion of the first rotation link such that, while the back frame is folded, the dive link is rotated in a forward direction and thereby the slide driving member is activated to rotate the first rotation link in a rearward direction to unlock the locking groove from the second hinge shaft.

* * * * *